United States Patent Office 3,472,580
Patented Oct. 14, 1969

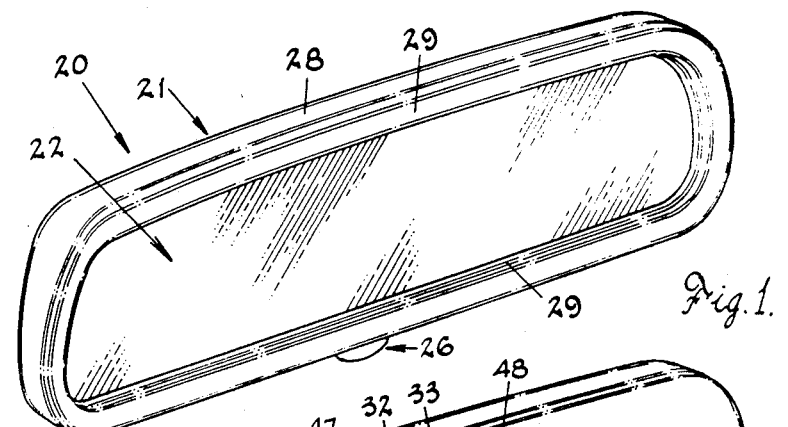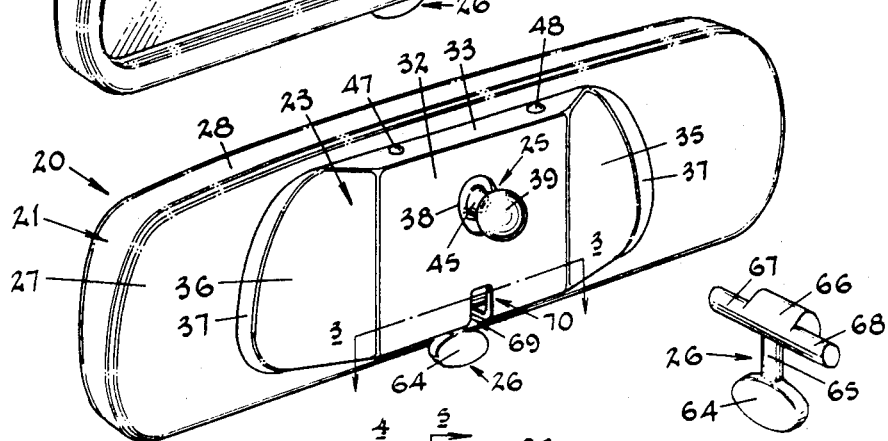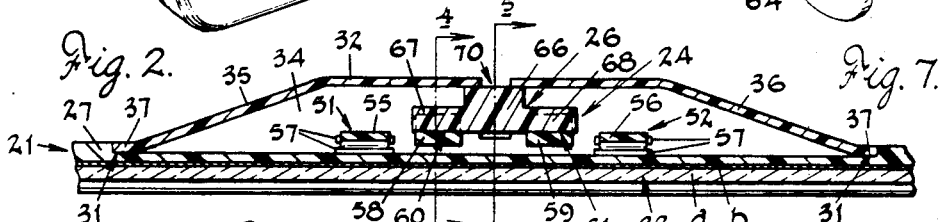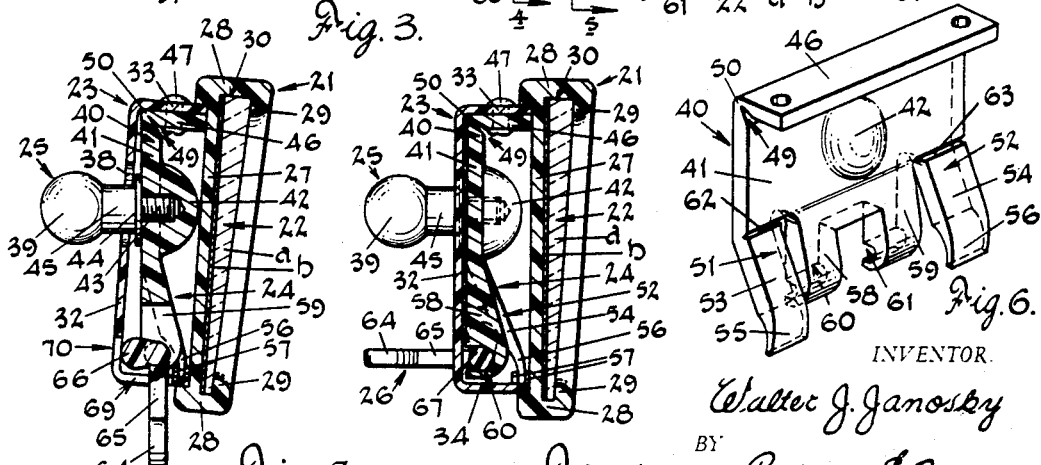

1

3,472,580
MULTIPLE POSITION REAR VIEW MIRROR WITH UNITARY PLASTIC HINGE BRACKET
Walter J. Janosky, Springdale, Pa., assignor to Libbey-Owens-Ford Company, a corporation of Ohio
Filed Nov. 20, 1967, Ser. No. 684,168
Int. Cl. G02b 17/00, 7/18
U.S. Cl. 350—281                    8 Claims

ABSTRACT OF THE DISCLOSURE

Multiple position rear view mirror in which the mirror adjusting means comprises a unitary hinge bracket member formed of plastic and including two hingedly connected parts, one being secured to a support member mounted in fixed relation to a vehicle and the other part secured to the mirror housing, and a rotatable cam engaging said hinge bracket member for adjusting the mirror from one reflecting position to a second reflecting position.

The present invention relates generally to rear view mirrors for automotive vehicles and the like, and more particularly to so-called multiple position rear view mirrors in which the reflecting mirror element or panel can be moved from one position to another to provide a high intensity reflection or a lower intensity reflection.

One hazard in driving an automobile upon roads at night is the glare from headlights from cars behind that of the driver, which glare is often, and at times unexpectedly, reflected into the eyes of the driver by the rear view mirror conventionally mounted interiorly of the car adjacent the upper or lower edge of the windshield. A single mirror has been developed having both a high intensity reflection for day driving and a lower intensity reflection for night driving. Such low intensity reflection substantially reduces headlight glare from following cars, thereby decreasing the hazard of a blinding effect of the glare and correspondingly increasing the safety and ease with which the vehicle may be handled.

Another hazard is that in most present day multiple position rear view mirrors, the adjusting mechanism consists of a plurality of metal parts which not only materially add to the cost of the mirror but, much more importantly, increase the liability of injury to the driver or passengers should the glass mirror plate become broken or dislodged, thereby exposing the metal adjusting mechanism to impact.

The intensity of the reflection reflected by the rear view mirror to the eyes of the driver is dependent upon the position of and the angle at which the light from the headlights from following cars strikes the mirror. The glass mirror plate constituting the reflecting element is usually prismoidal in cross section and has a reflecting coating applied to the back surface thereof.

An object of the present invention, therefore, is to provide a multiple intensity rear view mirror of improved construction which can be easily and conveniently adjusted to either one of two reflecting positions.

Another object of the invention is to provide such a rear view mirror which includes a prismoidal reflecting mirror element or panel and improved adjusting mechanism for moving the mirror element from one reflecting position to another.

Another object of the invention is to provide novel and simplified adjusting mechanism consisting of a minimum number of parts for effecting a smooth yet positive tilting of the mirror element to either of its reflecting positions and for maintaining it in such position without disturbing the setting of the mirror as a whole

2 or altering the driver's view of the road conditions to the rear of the vehicle.

A further object of the invention is to provide a rear view mirror having improved safety characteristics in that not only is the mirror case formed of a molded plastic material devoid of sharp edges or corners which could result in injury to the driver or passengers on impact, but in which the adjusting mechanism is also of a molded plastic material which further reduces liability of injury should the glass mirror plate be broken or dislodged and the adjusting mechanism become exposed to impact.

Other objects and advantages of the invention will become more apparent during the course of the following description when taken in connection with the accompanying drawings.

In the drawings, wherein like numerals are employed to designate like parts throughout the same:

FIG. 1 is a perspective front view of a rear view mirror constructed in accordance with the invention, FIG. 2 is a perspective view of the mirror looking at the back thereof, FIG. 3 is a longitudinal section through the mirror taken along line 3—3 of FIG. 2, FIG. 4 is a vertical transverse section taken along line 4—4 of FIG. 3 showing the mirror in position to provide one intensity reflection, FIG. 5 is a similar view taken along line 5—5 of FIG. 3 showing the mirror adjusted to a position to provide another intensity reflection, FIG. 6 is a perspective view of the hinge bracket member, and FIG. 7 is a perspective view of the operating lever.

Referring now to the drawings, the mirror designated in its entirety by the numeral 20 comprises a case 21, a reflecting mirror element or panel 22 closing the front of the case, a housing 23 secured to the back of the case, and an adjusting mechanism 24 mounted in said housing in cooperative engagement with a support member 25 secured in fixed relation to the vehicle and actuatable by manipulation of an operating lever 26 projecting out of the lower edge of the housing to tilt or pivot the reflecting mirror element 22 and the housing 23 as a unit relative to support member 25 to position the mirror in either a high intensity reflection or a lower intensity reflection position.

The case 21 is molded from a suitable plastic material, such as a vinyl plastic, and comprises a substantially flat base member 27 having a forwardly directed peripheral flange 28 which extends entirely around the base member and terminates in an inturned lip 29 to form a groove 30 within which the mirror element 22 is fitted, with the said lip 29 overlapping the front face of the mirror element as shown in FIGS. 4 and 5. The mirror element is prismoidal in cross section and comprises a wedge-shaped glass plate a having a suitable type reflecting coating b applied to the back surface thereof.

The rear surface of the base member 27 of case 21 is formed with a depressed or recessed area 31 intermediate the ends thereof in which the housing 23, containing the mirror adjusting mechanism 24, is secured. The housing 23 is also molded of a relatively soft plastic material, such as a vinyl plastic, and comprises a flat rear wall 32 having forwardly directed top and bottom walls 33-34 and forwardly angled end walls 35-36, said top and bottom walls and end walls terminating in a flat rim 37 extending circumferentially of the housing but being relatively wider at the opposite ends than along the top and bottom thereof. The rim 37 is snugly received in the recessed area 31 in the base member 27, as shown in FIG. 3, and is secured to said base member preferably by heat sealing.

The adjusting mechanism 24 is mounted in the housing 23 upon the inner end of the support member 25 which extends through an opening 38 in the rear wall 32 of housing 23 and is provided at its rear end with a stud ball 39 suitably rigidly coupled to an automobile in the usual way.

The adjusting mechanism 24 may be said to consist of the operating lever 26 and a unitary hinge bracket member 40 shown in FIG. 6 and which is molded from a suitable plastic material, such as, for example polypropylene, nylon, delrin or acrylonitrile-butadiene-styrene. Other plastics which will effectively withstand the high and low temperatures to which a rear view mirror is subjected in normal use may also be used. Thus, the plastic used should have high tensile strength and the quality of remaining tough, flexible and resilient even at low temperatures. It should also have the characteristic of withstanding continued flexing without breaking and the ability to return to its original position after repeated bending operations.

The hinge bracket member 40 comprises a substantially rectangular body portion 41 provided substantially centrally thereof with a forwardly projecting protuberance 42 within which the inner end 43 of support member 25 is molded, a flat disk 44 separating the inner end 43 from the stem 45 which carries the stud ball 39.

The body portion 41 of hinge bracket member 40 is provided along its upper edge with an integral forwardly directed flange 46 which is secured to the top wall 33 of housing 23 by rivets 47–48, or in any other desired manner. Formed at the juncture of the body portion 41 and flange 46 is a forwardly directed longitudinally extending V-shaped groove 49 which results in a connecting web portion 50, constituting a thin, flexible hinge line along which the flange 46 can pivot or flex relative to the body portion 41 upon adjustment of the mirror.

Formed integral with the lower edge of the body portion 41, at the opposite ends thereof, are depending legs 51–52 having forwardly inclined flat portions 53–54 terminating in rearwardly curved tapering end portions 55–56 which are retained in grooves formed by spaced ribs 57 on the bottom wall of housing 23.

Also formed integral with the body portion 41 of the hinge bracket member and positioned inwardly of the legs 51–52 are the spaced depending fingers 58–59 provided with rearwardly facing notches 60–61 respectively.

Formed in the front surface of the hinge bracket member 40 at the juncture of the legs 51–52 and the body portion 41 are horizontal grooves 62–63 which facilitate flexing of said legs relative to said body portion upon adjustment of the mirror from one reflecting position to another.

The operating lever 26 comprises a finger piece 64 carried at the outer end of a stem 65, the inner end of which is integral with a horizontally disposed rocking cam 66 supported by horizontal trunnions 67–68. The operating lever is also preferably molded from a suitable plastic material such as, for example, a good grade of nylon. However, other plastics which are tough and resistant to abrasion may be used.

When the operating lever 26 and hinge bracket member 40 are in assembled position, the body portion 41 of the hinge bracket member is secured to the inner end 43 of support arm 39 and the flange 46 thereof secured to the top wall of the housing by the rivets 47–48, with the lower ends of the legs 51–52 being received between the ribs 57 on the bottom wall of the housing. The cam 66 will be positioned between the spaced fingers 58–59, with the trunnions 67–68 being received in the notches 60–61 of said fingers. The stem 65 of the operating lever will project outwardly of the housing through an L-shaped slot which includes a horizontal portion 69 formed in the bottom wall 34 of the housing and a vertical portion 70 formed in the back wall 32 thereof.

In the operation of the mirror, the support member 25 remains rigid with respect to the automobile to which it is mounted, and the hinge bracket member 40 is fixed with relation to said support member and to said housing. Upon movement of the operating lever 26 between the horizontal position in FIG. 4 and the vertical position in FIG. 5, the mirror can be adjusted from one reflecting position to another reflecting position to provide a high intensity reflection or a lower intensity reflection.

As illustrated in FIG. 4, when the mirror is used for day driving it is ordinarily disposed in a substantially vertical position, with the operating lever 26 in a substantially horizontal position. At this time, the cam 66 will be out of engagement with the rear wall 32 of the housing, the body portion 41 of the hinge bracket member 40 will be parallel with said rear wall and the fingers 58–59 will be disposed rearwardly of the legs 51–52.

When it is desired to adjust the mirror for night driving the operating lever 26 is moved forwardly to the vertical position shown in FIG. 5, whereupon the cam 66 will be rotated in a counter-clockwise direction to engage the rear wall of the housing, thereby urging the lower end thereof rearwardly to cause the housing and mirror element to tilt forwardly and downwardly as a unit in a clockwise direction upon pivoting or flexing of the flange 46 along the hinge line 50, to position the mirror as in FIG. 5.

Simultaneously, rotation of the cam will urge the fingers 58–59 forwardly of the legs 51–52, thereby causing a flexing of the legs 51–52 along the grooves 62–63 to increase the tension in the legs and maintain the fingers in firm engagement with the trunnions 67–68 of the operating lever to prevent vibration of the mirror and to lock it in tilted position.

When it is desired to return the mirror to its initial position the operating lever is again moved rearwardly to a horizontal position, whereupon the cam will be rotated in a clockwise direction away from the rear wall of the housing and pressure also removed from the fingers. This will relieve the tension at the flex points 62–63, whereupon the spring action of the flange 46 will automatically cause flexing thereof along the hinge line 50 to pivot the mirror in a counter-clockwise direction and return it to vertical position. As the mirror returns to vertical position the fingers 58–59 move rearwardly of the legs 51–52 as shown in FIG. 4 but the tension thereof maintains the cam firmly clamped between the fingers and the rear wall of the housing to prevent vibration and maintain the mirror in position.

As brought out above, the case 21 of the mirror, including the base member 27 and the housing 23 are molded of a relatively soft plastic material such as vinyl plastic, and the fact that the edges of the glass mirror plate are covered by the plastic case will present less liability to injury to the driver or passengers upon impact. Although the housing 23 is shown in FIGS. 2 and 3 as extending over only the central area of the base member 27, it will be appreciated that the housing may be longer if desired, and, in fact, can cover substantially the entire area of the base member, if preferred. By making the housing longer, added resistance against breakage would be imparted to the end portions of the glass mirror plate.

The forming of the hinge bracket member 40 of plastic imparts an added safety factor to the mirror in that should the glass mirror plate be broken or dislodged from its case upon impact and thereby expose the hinge bracket member there would be considerably less likelihood of injury than in those cases where the mirror adjusting means consists of a number of metal parts, at least some of which would have relatively sharp edges that could inflict injury upon impact.

It is to be understood that the form of the invention herewith shown and described is to be taken as a preferred embodiment of the same, and that various changes in the shape, size and arrangement of parts may be resorted to without departing from the spirit of the invention.

I claim:
1. A multiple position rear view mirror for vehicles, comprising an open front housing having a rear wall and forwardly directed top and bottom walls, a mirror element carried by said housing and closing the front thereof, a support member passing through an opening in the rear wall of the housing and adapted to be secured in fixed relation to a vehicle, a unitary hinge bracket member formed of a plastic material mounted in said housing and including a body portion fixed to said support member and a forwardly directed flange integral with said body portion and hingedly connected thereto along a hinge line, means for securing said flange to the top wall of said housing, an operating lever including a rotatable cam member carried by said bracket member remote from said hinge line, and a cam surface on said cam member engageable with the rear wall of said housing, upon rotation of said cam member to pivot said housing and mirror element as a unit about said hinge line and move said mirror from one reflecting position to a second reflecting position.

2. A multiple position rear view mirror for vehicles as defined in claim 1, in which said flange is hingedly connected to said body portion by a flexible and resilient web portion which constitutes said hinge line.

3. A multiple position rear view mirror as defined in claim 2, including means carried by the bottom wall of said housing for restraining the lower end of the hinge bracket member against movement relative thereto.

4. A multiple position rear view mirror as defined in claim 3, in which said body portion is formed with spaced depending fingers for supporting said cam for rotatable movement therebetween.

5. A multiple position rear view mirror as defined in claim 4, in which said fingers are provided with rearwardly directed notches, and in which said cam is supported by trunnions received in said notches.

6. A multiple position rear view mirror as defined in claim 1, including spaced depending legs integral with said body portion, means carried by the bottom wall of the housing for restraining the lower ends of said legs against movement relative thereto, and spaced depending fingers also formed integral with said body portion and spaced inwardly of said legs for supporting said cam therebetween.

7. A multiple position rear view mirror as defined in claim 6, in which said legs incline downwardly and forwardly from said body portion, and in which horizontal grooves are formed at the juncture of said legs and body portion to provide flex points for said legs.

8. A multiple position rear view mirror as defined in claim 7, in which said fingers are provided with rearwardly directed notches, and in which said cam is supported by trunnions received in said notches.

References Cited

UNITED STATES PATENTS

| | | | |
|---|---|---|---|
| 2,691,919 | 10/1954 | Springer | 350—280 |
| 2,722,159 | 11/1955 | Budreck | 350—280 |
| 2,838,979 | 6/1958 | Meade | 350—281 |
| 3,019,486 | 2/1962 | Stinson. | |

FOREIGN PATENTS

| | | |
|---|---|---|
| 1,203,145 | 10/1965 | Germany. |
| 1,123,827 | 6/1956 | France. |
| 993,636 | 6/1965 | Great Britain. |
| 644,424 | 7/1962 | Canada. |

DAVID SCHONBERG, Primary Examiner

P. R. GILLIAM, Assistant Examiner